United States Patent
Gillespie et al.

(10) Patent No.: US 6,901,400 B2
(45) Date of Patent: *May 31, 2005

(54) METHOD AND APPARATUS FOR RETRIEVING AND CONVERTING REMOTELY STORED NON-STANDARD GRAPHIC IMAGES AND STORING THE CONVERTED IMAGES IN A DATABASE

(75) Inventors: Daryll J. Gillespie, Chesterfield, MO (US); Frederic C. Sobel, Valley Park, MO (US)

(73) Assignee: Northrop Grumman Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 67 days.

(21) Appl. No.: 09/360,154
(22) Filed: Jul. 26, 1999

(65) Prior Publication Data

US 2002/0059243 A1 May 16, 2002

Related U.S. Application Data

(60) Provisional application No. 60/094,335, filed on Jul. 28, 1998.

(51) Int. Cl.⁷ .............................................. G06F 17/30
(52) U.S. Cl. ..................... 707/6; 707/1; 707/3; 707/10; 707/104.1; 345/440; 345/660; 345/671
(58) Field of Search .......................... 707/6, 101, 505, 707/507, 10, 102, 103 R, 3, 104.1; 345/660, 671, 23, 751, 752, 810, 835, 753, 758, 472.3, 428, 629, 440

(56) References Cited

U.S. PATENT DOCUMENTS

| | | | | | |
|---|---|---|---|---|---|
| 5,490,243 | A | * | 2/1996 | Millman et al. | 395/148 |
| 5,678,046 | A | * | 10/1997 | Cahill et al. | 707/200 |
| 5,713,019 | A | * | 1/1998 | Keaten | 707/10 |
| 5,917,965 | A | * | 6/1999 | Cahill et al. | 382/305 |
| 5,940,844 | A | * | 8/1999 | Cahill et al. | 707/526 |
| 5,963,659 | A | * | 10/1999 | Cahill et al. | 382/139 |
| 5,991,783 | A | * | 11/1999 | Popa et al. | 707/522 |
| 6,012,068 | A | * | 1/2000 | Boezeman et al. | 707/104 |
| 6,226,407 | B1 | * | 5/2001 | Zabih et al. | 382/209 |

FOREIGN PATENT DOCUMENTS

JP      2000125068      * 4/2000      ........... G06F/17/30

OTHER PUBLICATIONS

NCR 7780 brochure for "Mid–Range Item Processing Transport", Web site: http://www.ncr.com/products/hardware/hw_7780_product.htm.

* cited by examiner

Primary Examiner—Jean M. Corrielus
(74) Attorney, Agent, or Firm—Lowe Hauptman & Berner LLP.

(57) ABSTRACT

The present invention is directed to a process enabling users to retrieve and view remotely stored proprietary images in a standard graphics image format (i.e., JPEG, TIFF, GIF, etc.) without using the legacy system in which the images are stored. Converting the non-standard image file to a standard graphics image file format affords the user with a greater choice in image viewing software since a standard image file format is more likely to be widely implemented, while the non-standard image file format is proprietary and unlikely to be supported by a wide variety of image viewing software.

14 Claims, 5 Drawing Sheets

METHOD AND APPARATUS FOR RETRIEVING AND CONVERTING REMOTELY STORED NON-STANDARD GRAPHIC IMAGES AND STORING THE CONVERTED IMAGES IN A DATABASE

RELATED APPLICATION

The present application claims priority of U.S. Provisional Application Ser. No. 60/094,335, filed Jul. 28, 1998, entitled "METHOD FOR RETRIEVING AND CONVERTING REMOTELY STORED NON-STANDARD GRAPHIC IMAGES", the disclosure of which is incorporated by reference herein in its entirety.

FIELD OF THE INVENTION

The present invention relates generally to image processing methods, and more particularly, to a method for processing non-standard format graphic images into a standard image file forming a standard image file.

BACKGROUND OF THE INVENTION

Legacy systems frequently have non-standard image files stored therein. These non-standard image files are difficult and time intensive to convert. Retrieval times are often 40 seconds or more. Thus, there is a need in the art to provide a retrieval and conversion system and method in which a non-standard image file can be quickly and easily converted to a standard format for viewing and/or printing.

SUMMARY OF THE INVENTION

The present invention is directed to a process enabling users to retrieve and view remotely stored proprietary images in a standard graphics image format (i.e., JPEG, TIFF, GIF, etc.) without using the legacy system in which the images are stored. Converting the non-standard image file to a standard graphics image file format affords the user with a greater choice in image viewing software since a standard image file format is more likely to be widely implemented, while the non-standard image file format is proprietary and unlikely to be supported by a wide variety of image viewing software.

The present invention allows a legacy system's capability to be easily integrated with other software environments and clients (e.g., web clients, Java applets, Java applications, two and three-tier clients in a client-server environment, etc.). The present invention also results in a conversion of the nonstandard image file format to a standard graphics file format, which allows the image to be viewed easily with several commercial-off-the-shelf software packages. Because the non-standard image file format is often proprietary, a special request must be made to print a non-standard image file, while a standard image file format is easily printed from the desktop of the user. The retrieval and conversion process of the present invention puts little or no load on the existing legacy system and require no changes to the legacy system's software baseline or the hardware environment.

These and other objects of the present invention are achieved by a method of retrieving and converting remotely stored non-standard graphic images which include retrieving the non-standard image from a first computer, converting the non-standard image to a standard image format, and inserting the converted image into an existing database as a binary large object.

The foregoing and other objects of the present invention are achieved by a method of retrieving and converting a remotely stored non-standard graphic image file which includes determining page information (e.g., size, orientation, number of pages, etc.) from the non-standard image file to determine the number of pages of the non-standard graphic image. Page information determined from the non-standard graphic image file are converted and used in the opened standard graphic image file. The page information and raw image data from the nonstandard graphic image file are read into a buffer. The next page is incremented in the non-standard graphic image file.

The foregoing and other objects of the present invention are achieved by a computer architecture including retrieving means for retrieving the non-standard image from a first computer. Converting means are provided for converting the non-standard image to a standard image format. Inserting means are provided for inserting the converted image into an existing database as a binary large object.

The foregoing and other objects of the present invention are achieved by an article including a computer readable medium having stored thereon a plurality of sequences of instructions, the plurality of sequences of instructions including sequences of instructions which, when executed by a processor, cause the processor to perform the steps of retrieving the non-standard image from a first computer, converting the non-standard image to a standard image format, and inserting the converted image into an existing database as a binary large object.

The foregoing and other objects of the present invention are achieved by a computer system including a processor and a memory coupled to the processor, the memory having stored therein sequences of instructions which, when executed by the processor, cause the processor to retrieve the non-standard image from a first computer. The non-standard image is converted to a standard image format. The converted image is inserted into an existing database as a binary large object.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for retrieving and converting remotely stored non-standard graphic images are described.

In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
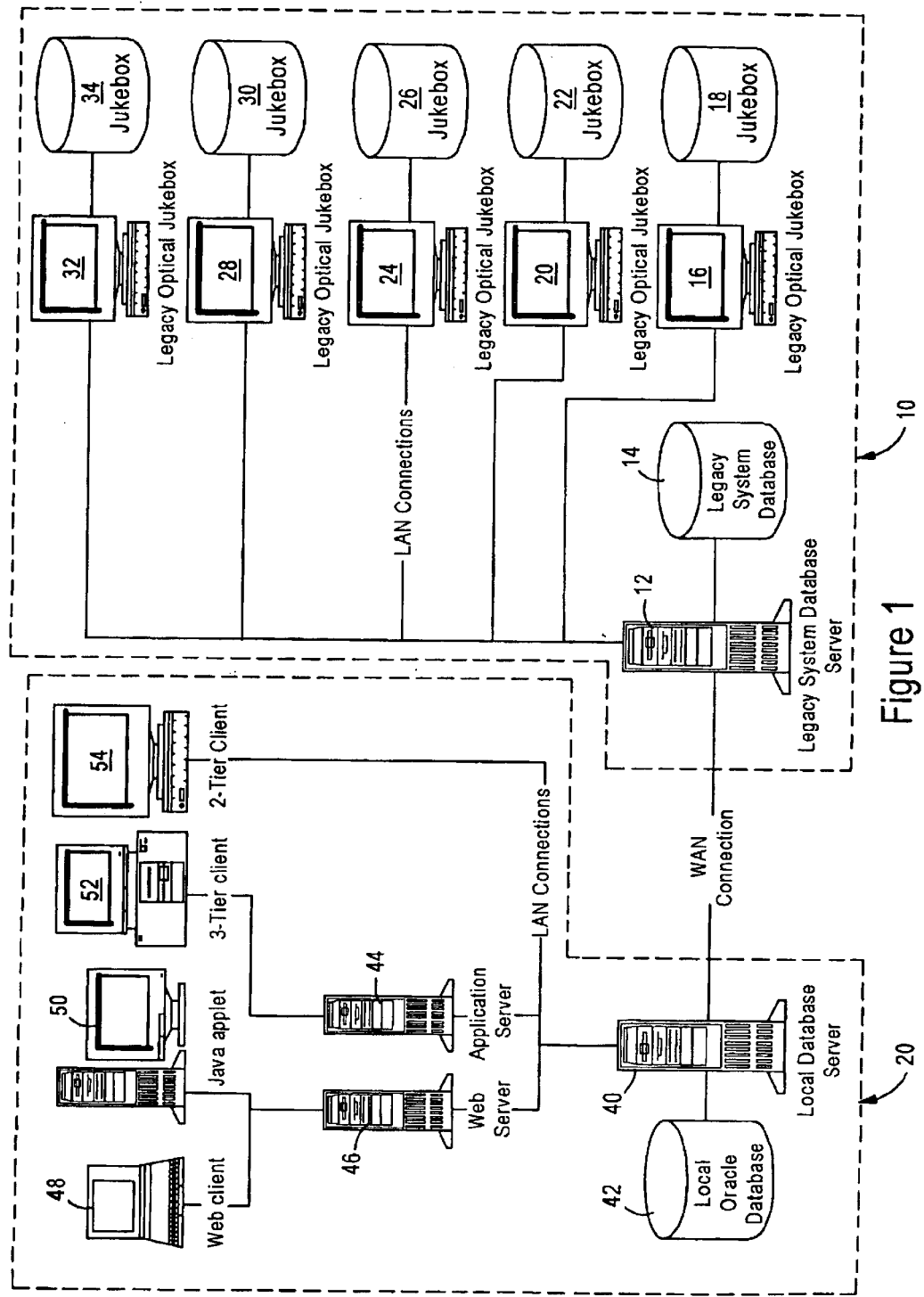
FIG. 1 is an illustration of the hardware and network connectivity for retrieving and converting remote non-standard format images according to the present invention.

An exemplary network hardware configuration usable with the present invention is depicted in FIG. 1. In FIG. 1, there is an example of a legacy system, generally depicted at 10. The legacy system 10 includes a legacy system database server 12 coupled to a legacy system database 14. The legacy system database server 12 is also coupled to a plurality of legacy optical jukebox servers 16, 20, 24, 28 and 32 which are in turn coupled to jukeboxes 18, 22, 26, 30 and 34, respectively. The legacy system 10 is coupled via a wide area network connection to a local area network (LAN), generally indicated at 20. The LAN 20 includes a local database server 40 which is coupled to a local database 42. The local database server 40 is also coupled to an application server 44 and a web server 46. The application server 44 is connected to a 3-tier client 52. The web server 46 is coupled to a web client 48 and a Java applet 50. The local database server 40 is also connected to a 2-tier client 54. As can be appreciated, the hardware configurations depicted are only exemplary and can be modified. The legacy system 10, for example, can include many other hardware configurations as well as additional optical jukeboxes. On the client's side of the LAN 20, other and different clients can also be included.

Figure 2:
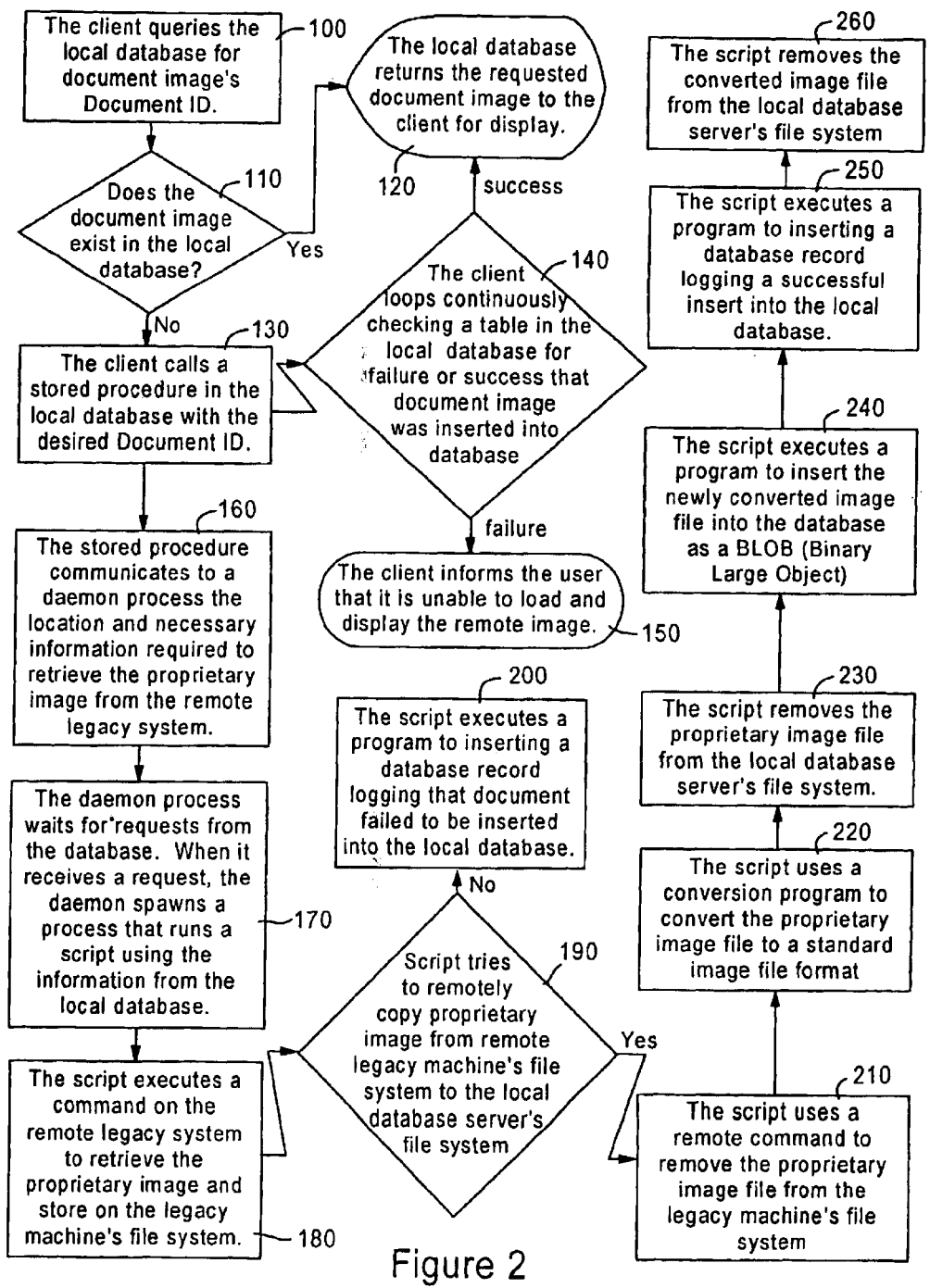
FIG. 2 is a flow diagram of the retrieval and conversion process.

The following is a description of the remote retrieval and conversion process according to the present invention. The executable code used in the computer software of the present invention is written as a foreign shell script for a Unix platform but could be any type of script. As illustrated in FIG. 2 at step 100, the retrieval and conversion process is started when a client calls a stored procedure in the database server 40 with the unique document ID of the required image. This database will be used to temporarily store images and hold tables necessary to authenticate users, verify the documents they can see, and search for documents.

The images cached in the database use an algorithm driven by two parameters, LOW_WATER_MARK and HIGH_WATER_MARK. When used space becomes greater than the HIGH_WATER_MARK, the images are removed from cache in order of oldest viewed until used space becomes less than LOW_WATER_MARK. The values for LOW_WATER_MARK and HIGH_WATER_MARK can be adjusted based on space and usage.

At step 110, the stored procedure then gathers the necessary information for that document by first determining if the document image exists in the local database 42. At step 120, if the document image is cached in the local database 42, then the local database server 40 returns the requested document image to the client 48, 52, 54 which requested the document image for display. At step 130, if the document image is not cached in the local database 42, then the client 48, 52, 54 calls a stored procedure in the local database 42 with the desired document's unique document ID at step 130. At step 140, the client 48, 50, 52 loops continuously checking a table in the local database 42 for failure or success that the document image was inserted into the local database 42. If step 140 is successful, then the process returns to step 120. If step 140 is unsuccessful, then the process continues to step 150 where the client informs the user that it is unable to load the image and display the remote image.

The information includes the host where the image is stored, the platter the image is stored on, the size of the image, and the location of the image on the platter as an offset. At step 160, the database passes the information to a daemon process running in the background on the database server.

At step 160, the stored procedure in the local database 42 communicates to the daemon process the location and necessary information required to retrieve the proprietary image from the remote legacy system 10. The daemon continually loops waiting for requests from the database 42. At step 170, the daemon process waits for requests from the local database 42. When the daemon receives a request at step 170, it spawns a thread to execute a script with the information from the database. At step 180, the script executes several commands from an operating system shell. The first command is remotely executed on the host with the optical jukebox that contains the image file to be retrieved; it tries to read the image from the optical platter it is stored on and copy this file to the local file system. At step 190, the script then tries to remotely copy the file to the database server file system. If the script fails to copy the image, at step 200, it then executes a program that inserts a record into the database logging that the retrieval failed for that document. If the image is copied successfully at step 190, then the copy of the file on the remote file system of the optical jukebox is deleted at step 210 and the image is converted at step 220 from a proprietary non-standard format to a standard image file format. At step 230, the proprietary image is removed from the database server 40, and the standard image file format is inserted into the database 42 at step 240. At step 250, on a successful insertion of the standard image file format, a program executes to insert a record into the database, logging that the retrieval succeeded for that document. The client then checks to see if the retrieval failed or succeeded. At step 260, if the retrieval succeeded, the image is extracted from the database and displayed by the client.

Figure 3:
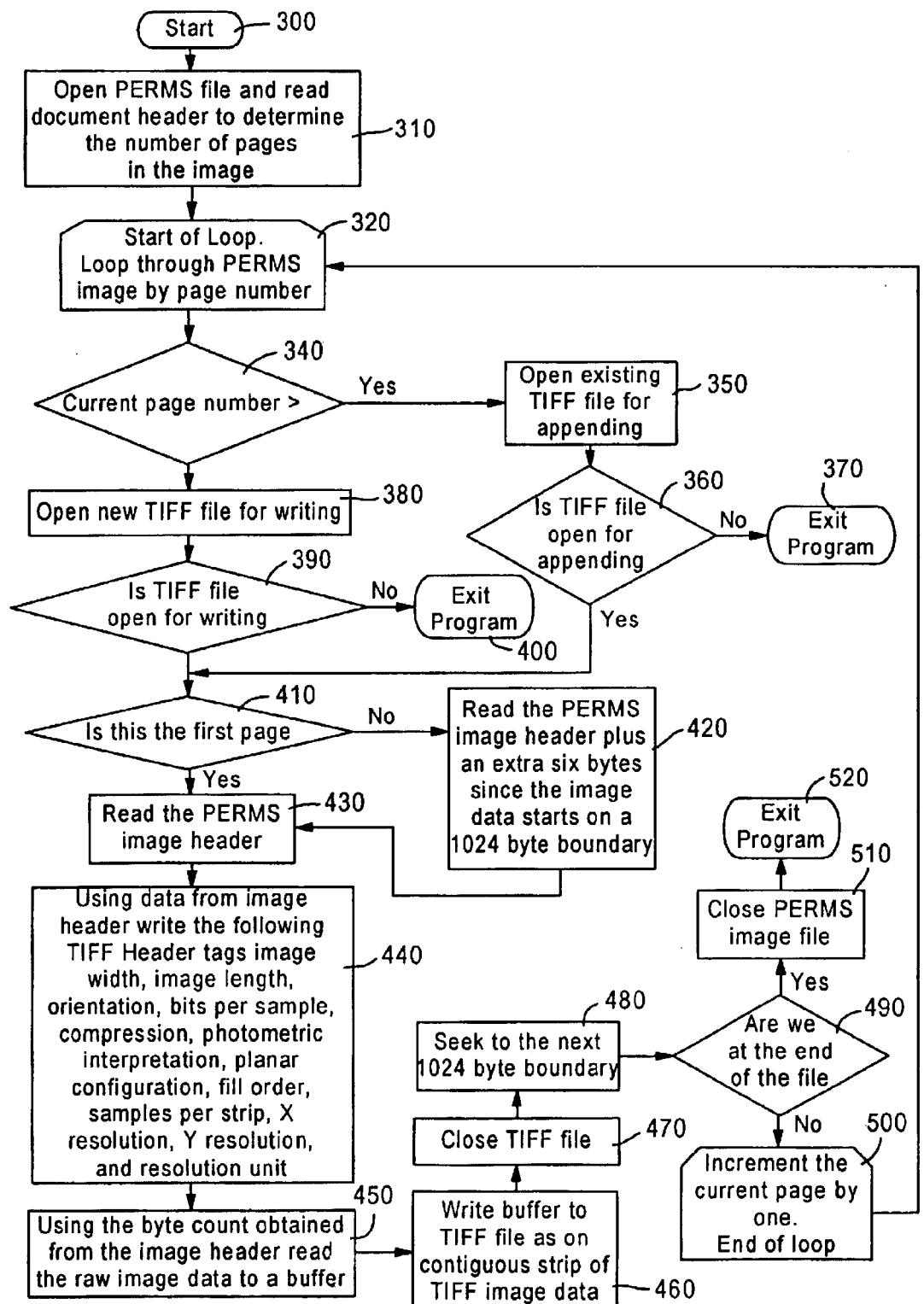
FIGS. 3 and 4 are sequence diagrams for both successful and failed remote retrieval and conversion process for a non-standard format image.

Turning now to FIG. 3, at step 300, the process is started. The process of FIG. 3 is directed to converting a non-standard graphic image such as a PERMS image. PERMS stands for Personnel Electronic Records Management System. At step 310, a PERMS file is opened and the document header is read to determine the number of pages in the image. At step 320, at the start of the loop, the PERMS image is looped through by page number. At step 340, it is determined whether the current page number is greater than 1. If the determination at step 340 is yes, then at step 350 an existing TIFF file is opened for appending. At step 360, it is determined whether the TIFF file is open for appending. If the determination at step 360 is no, then at step 370, the program is exited. If the determination at step 360 is yes, then the process proceeds to step 410. Returning to step 340, if the current page number is not greater than 1, then at step 380, a new TIFF file is opened for writing. At step 390, it is determined whether the TIFF file is open for writing. If the determination at step 390 is no, then the program is exited at step 400. From either a yes determination at step 390 or a yes determination at step 360, at step 410, it is determined if this is the first page. If the determination at step 410 is no, then at step 420, the image header of the PERMS file is read plus an extra six bytes since the image data starts on a 1,024 byte boundary. From either step 420 or a yes determination at step 410, at step 430, the PERMS image header is read. At step 440, using data from the image header, the following are written: TIFF header tags image width, image length, orientation, bits per sample, compression, photometric interpretation, planar configuration, fill order, samples per pixel, rows per strip, X resolution, Y resolution and resolution unit. At step 450, using the byte count obtained from the image header, the raw image data is read into a buffer. At step 460, the buffer is written as a TIFF file as on a continuous strip of TIFF image data. At step 470, the TIFF file is closed. At step 480, the next 1,024 byte boundary will be sought. At step 490, it is determined if the image is at the end of file. If the determination at step 490 is no, then at step 500, the current page is incremented by 1 and the process is at the end of loop and returns to step 320. If the determination at step 490 is yes, then at step 510, the PERMS image file is closed. At step 520, the program is exited.

Figure 4:
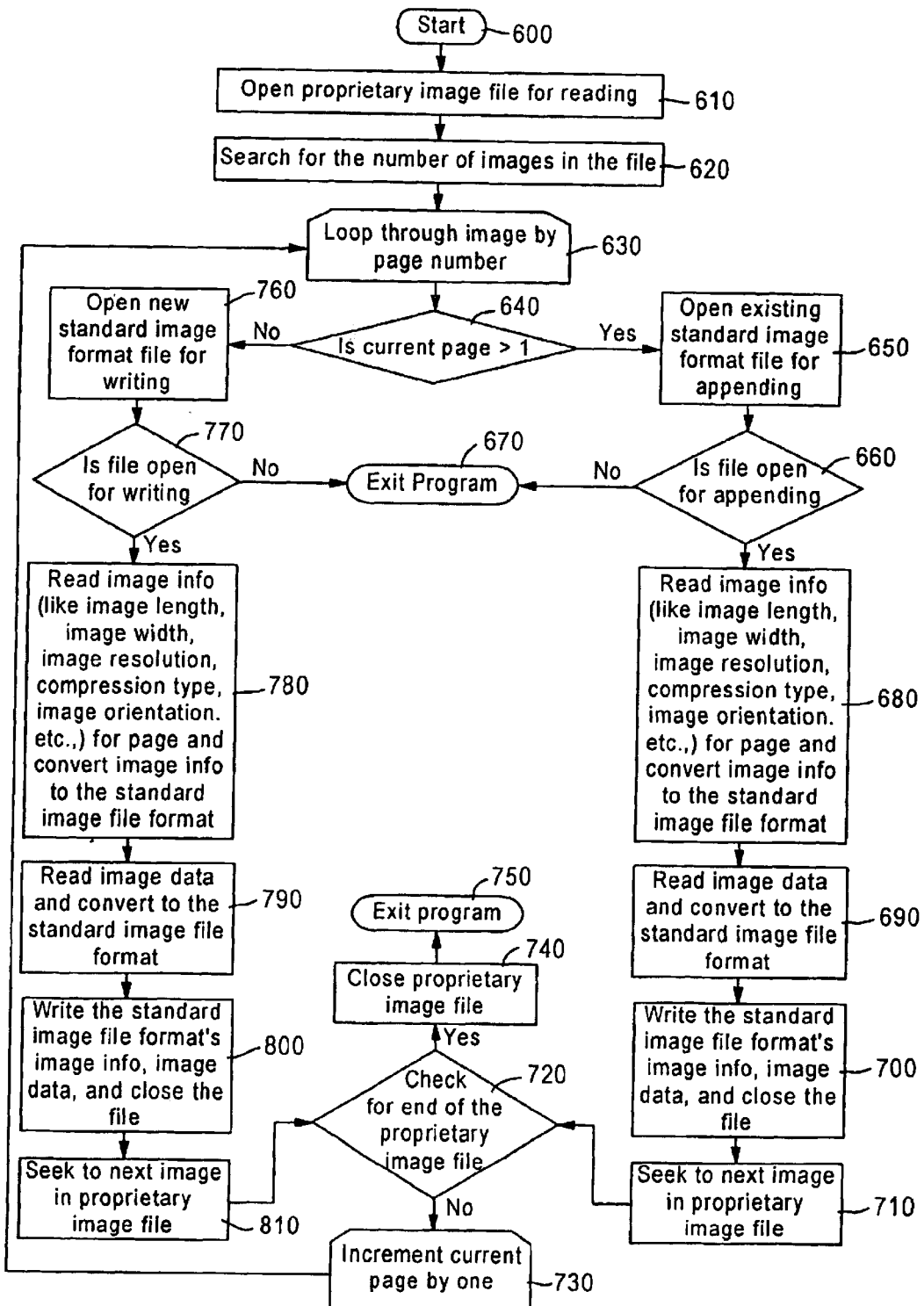

Turning now to FIG. 4 at step 600, the process is started. This process is directed to converting a non-standard image file to a standard image file. At step 610, a proprietary image file is open for reading. At step 620, the number of images in the file is determined. At step 630, the images by page number are looped through. At step 640, it is determined whether the current page is greater than 1. If the current page is greater than 1, then at step 650, an existing standard image format file is open for appending. At step 660, it is determined whether the file is open for appending. If the determination at step 660 is no, then at step 670, the program is exited. If the determination at step 660 is yes, then at step 680, the image's page information is read. The image's page information includes information such as like image length, image width, image resolution, compression type, image orientation, etc. The image information for the page is converted to the standard image file format. At step 690, the image data is read and converted to the standard image file format. At step 700, the standard image file format is written, including image information, image data and close the file. At step 710, the image in the proprietary image file is sought. At step 710, a determination is made to check for end of the proprietary image file. If the determination at step 720 is no, then at step 730, the current page is incremented by 1. The process then returns to step 630. If the determination at step 720 is yes, then at step 740, the proprietary image file is closed. At step 750 the program is exited. If the determination at step 640 is no, then at step 760, a new standard image format file is open for writing. At step 770, a determination is made as to whether the file is opened for writing. If the file is not open for writing at step 770, then the process proceeds to step 670, where the program is exited. If the determination at step 770 is yes, then the image's page information is converted to the standard image file format. The image's page information includes information such as image length, image width, image resolution, compression-type, image orientation, etc. At step 790, image data is read and converted to the standard image file format. At step 800, the standard image file format is written which includes image's page information, image data and the file is closed. At step 810, the next image in the proprietary image file is sought. The process then proceeds to step 720, where the end of proprietary image file is closed.

Hardware Overview

Figure 5:
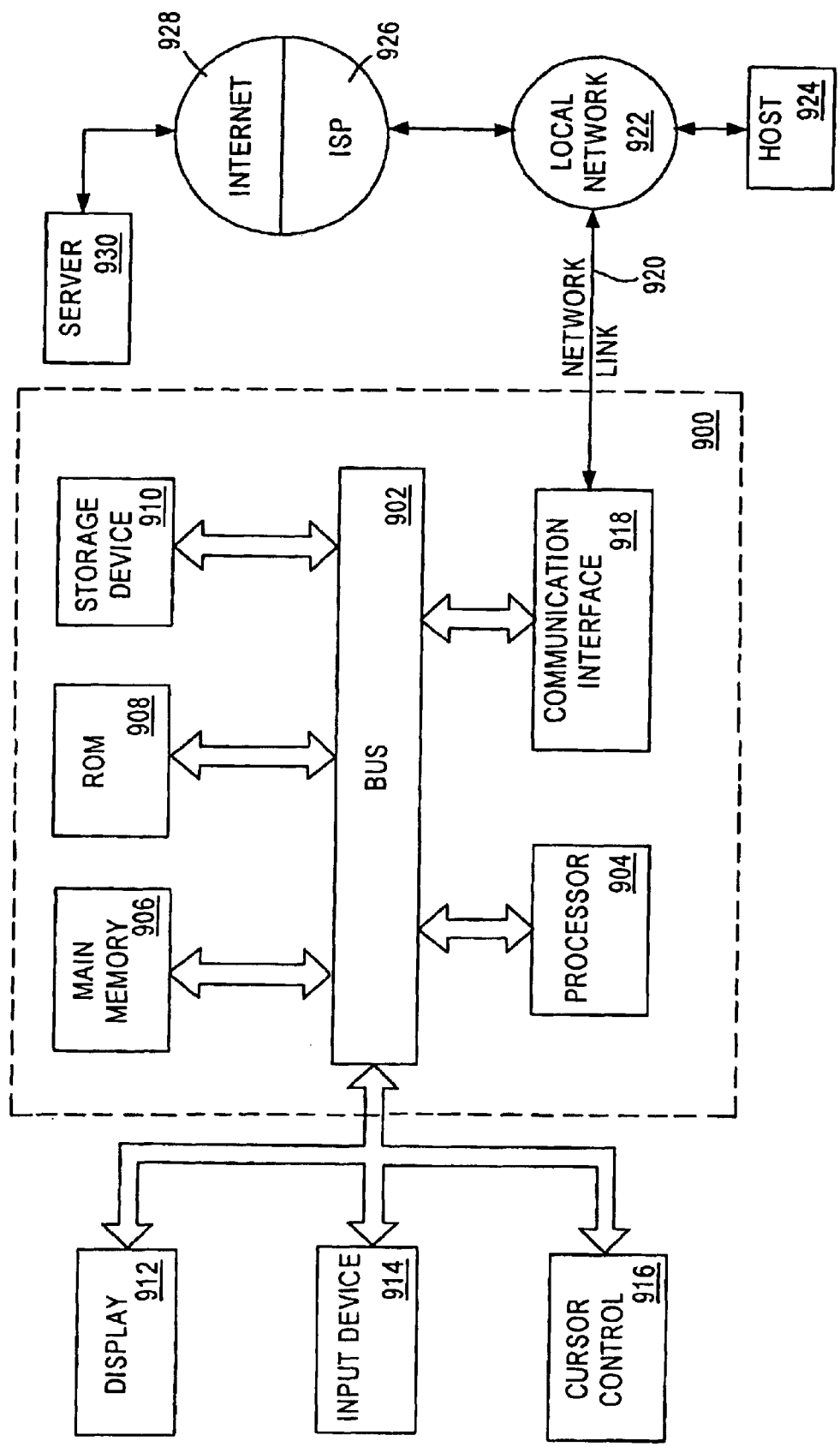
FIG. 5 is a high level block diagram of a computer architecture usable with the present invention.

FIG. 5 is a block diagram illustrating an exemplary computer system 900 upon which an embodiment of the invention may be implemented. The present invention is usable with currently available personal computers, mini-mainframes and the like.

Computer system 900 includes a bus 902 or other communication mechanism for communicating information, and a processor 904 coupled with the bus 902 for processing information. Computer system 900 also includes a main memory 906, such as a random access memory (RAM) or other dynamic storage device, coupled to the bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to the bus 902 for storing static information and instructions for the processor 904. A storage device 910, such as a magnetic disk or optical disk, is provided and coupled to the bus 902 for storing information and instructions.

Computer system 900 may be coupled via the bus 902 to a display 912, such as a cathode ray tube (CRT) or a flat panel display, for displaying information to a computer user. An input device 914, including alphanumeric and other keys, is coupled to the bus 902 for communicating information and command selections to the processor 904. Another type of user input device is cursor control 916, such as a mouse, a trackball, or cursor direction keys for communicating direction information and command selections to processor 904 and for controlling cursor movement on the display 912. This input device typically has two degrees of freedom in two axes, a first axis (e.g., x) and a second axis (e.g., y) allowing the device to specify positions in a plane.

The invention is related to the use of a computer system 900, such as the illustrated system, to retrieve and convert remotely stored non-standard graphic images. According to one embodiment of the invention, retrieval and conversion of the remotely stored non-standard graphic images is provided by computer system 900 in response to processor 904 executing sequences of instructions contained in main memory 906. Such instructions may be read into main memory 906 from another computer-readable medium, such as storage device 910. However, the computer-readable medium is not limited to devices such as storage device 910. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 906 causes the processor 904 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 900 also includes a communication interface 918 coupled to the bus 902. Communication interface 918 provides a two-way data communication as is known. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. In the preferred embodiment communication interface 918 is coupled to a virtual blackboard. Wireless links may also be implemented. In any such implementation, communication interface 918 sends and receives electrical, electromagnetic or optical signals which carry digital data streams representing various types of information. Of particular note, the communications through interface 918 may permit transmission or receipt of the remotely stored nonstandard graphic images. For example, two or more computer systems 900 may be networked together in a conventional manner with each using the communication interface 918.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the "Internet" 928. Local network 922 and Internet 928 both use electrical, electromagnetic or optical signals which carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for information discovery and visualization as described herein.

The received code may be executed by processor 904 as it is received, and/or stored in storage device 910, or other non-volatile storage for later execution. In this manner, computer system 900 may obtain application code in the form of a carrier wave.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is, therefore, intended that the protection granted hereon be limited only by the definition contained in the appended claims and equivalents thereof.

What is claimed is:

1. A method of retrieving and converting remotely stored non-standard image format files, comprising:
    retrieving the non-standard image format file from a first computer to a second computer;
    converting the non-standard image format file to a standard image format file at the second computer; and
    inserting the converted image file into an existing database as a binary large object.

2. The method of claim 1, comprising removing the non-standard image from the first computer.

3. The method of claim 1, comprising querying a local database for a document ID.

4. The method of claim 1, comprising spawning a script using information from a database to locate the non-standard image from a legacy system.

5. The method of claim 4, comprising removing file information from the first computer concerning the retrieved non-standard image.

6. The method of claim 1, comprising determining if the non-standard image exists in a local database.

7. The method of claim 6, comprising of the non-standard image does not exist at the first computer, inserting a record into the local database that the non-standard could not be located.

8. The method of claim 1, further comprising retrieving a converted image and printing the converted image.

9. The method of claim 1, further comprising retrieving a converted image and viewing the converted image.

10. A method of retrieving and converting a remotely stored non-standard graphic image file, comprising:
    reading information from the non-standard graphic image file to determine the number of pages of the non-standard graphic image;
    opening a standard graphic image file for writing or appending;
    writing information from the non-standard graphic image file into the opened standard graphic file;
    using the information read from the non-standard graphic image file, read raw image data of the non-standard graphic image into a buffer; and
    increment to the next page in the non-standard graphic image file.

11. The method of claim 10, wherein the non-standard graphic image's page information includes image width, orientation, bits per sample, compression, photometric interpretation, planar configuration, fill order, samples per pixel, rows per strip, X resolution, Y resolution, and resolution unit.

12. A computer architecture, comprising:
    retrieving means for retrieving a non-standard image from a first computer;
    converting means for converting the non-standard image file to a standard image format file at the second computer; and
    inserting means for inserting the converted image file into an existing database as a binary large object.

13. An article, comprising:
    at least one sequence of machine executable instructions;
    a medium bearing the executable instructions in machine readable form, wherein execution of the instructions by one or more processors causes the one or more processors to:
    retrieve a non-standard image file from a first computer to a second computer;
    convert the non-standard image file to a standard image format file at the second computer; and
    insert the converted image file into an existing database as a binary large object.

14. A computer system, comprising:
    a processor; and
    a memory coupled to said processor, the memory having stored there in sequences of instructions, which, when executed by said processor, cause said processor to:
    retrieve a non-standard image file from a first computer to a second computer;
    convert the non-standard image file to a standard image format file at the second computer; and
    insert the converted image file into an existing database as a binary large object.

* * * * *